(Model.)
T. R. WAY.
ICE TONGS.
No. 247,861. Patented Oct. 4, 1881.
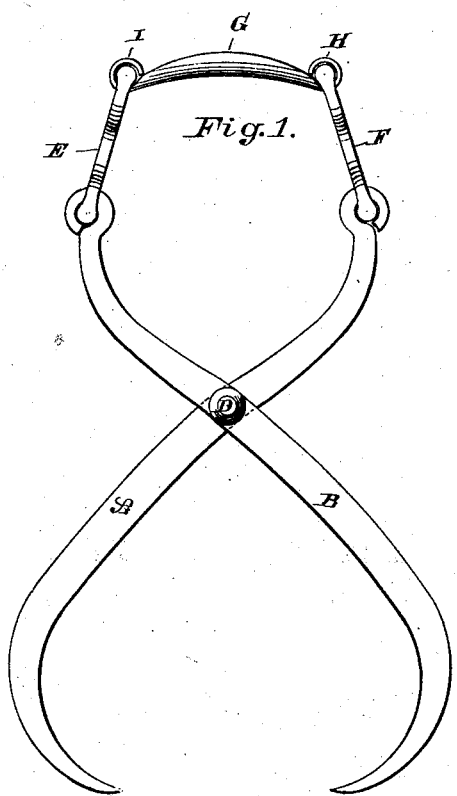
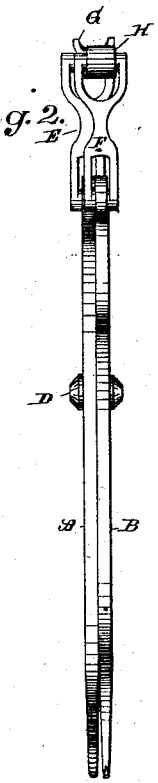
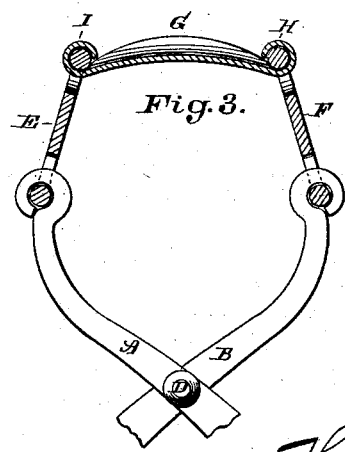
Attest:
Herm. Lauten,
E. T. Walker.
Inventor:
Thomas R. Way.
By H. S. Abbot.
Attorney.

UNITED STATES PATENT OFFICE.

THOMAS R. WAY, OF SPRINGFIELD, OHIO.

ICE-TONGS.

SPECIFICATION forming part of Letters Patent No. 247,861, dated October 4, 1881.

Application filed August 24, 1881. (Model.)

*To all whom it may concern:*

Be it known that I, THOMAS R. WAY, a citizen of the United States of America, residing at Springfield, in the county of Clarke and State of Ohio, have invented certain new and useful Improvements in Ice-Tongs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a side elevation. Fig. 2 is an end elevation, and Fig. 3 is a side elevation of the upper part, showing the handle and stirrups in section.

My invention relates to ice-tongs; and it consists in the construction and arrangement of parts as will be hereinafter more fully described, and pointed out in the claim.

In the accompanying drawings, A and B represent two arms, with inwardly-curved pointed lower ends joined together by a pivot at D and inwardly-curved upper ends provided with eyes for receiving the stirrups E and F, which may be of any suitable length, composed of one piece of metal, and provided at both ends with suitably-formed eyes for receiving the end of the arm and the handle G, which is so attached as to give the stirrups free play backward and forward.

The handle G may be made of any suitable kind of flat piece of metal, bent round in cross-section and slightly curved from end to end, to make a suitable form to be grasped by the hand, and the ends H and I are passed through the upper eyes of the stirrups E and F and bent upward and over the end of the stirrups, making a hinge.

The handle should be of such length as to cause the stirrup and the upper end of the arm to form a straight line between the end of the handle and the pivoted point of the arms when the lower ends of the arms are brought together.

Having thus described my invention, I claim as new—

The combination of the arms A and B with the stirrups E and F and handle G, all constructed, arranged, and operating as shown and described.

In testimony whereof I affix my signature in presence of two witnesses.

THOMAS R. WAY.

Witnesses:
 AMOS WOLFE,
 I. F. HAMILTON.